United States Patent Office 3,331,666
Patented July 18, 1967

3,331,666
ONE-STEP METHOD OF CONVERTING URANIUM HEXAFLUORIDE TO URANIUM COMPOUNDS
William C. Robinson, Knoxville, and Richard L. Heestand and Carl F. Leitten, Jr., Oak Ridge, Tenn., assignors to the United States of America as represented by the United States Atomic Energy Commission
No Drawing. Filed Oct. 28, 1966, Ser. No. 591,042
10 Claims. (Cl. 23—347)

ABSTRACT OF THE DISCLOSURE

This disclosure describes a method of making a uranium compound selected from uranium nitride, carbide, sulfide, silicide or phosphide from uranium hexafluoride by mixing $UF_6$ and a gas containing nitrogen, carbon, sulfide, silicon or phosphorus with an alkali metal vapor at a temperature of 800–1300° C. and a pressure less than 25 torr (1 mm. Hg).

The invention described herein was made in the course of, or under, a contract with the U.S. Atomic Energy Commission.

Our invention relates to methods of converting $UF_6$ into uranium compounds suitable for use in nuclear reactor fuel elements.

Uranium usually exists in the form of $UF_6$ at some time during its processing history, and, for use as a nuclear reactor fuel, must be converted from $UF_6$ to a compound suitable for use in a fuel element. Although one-step processes have been developed to convert $UF_6$ to either uranium metal or uranium oxide, preparation of other compounds, as, for example, uranium nitride and uranium carbide, have required multi-step processes. A typical multi-step process for making uranium nitride comprises reducing $UF_6$ to $UF_4$ with hydrogen, reducing the $UF_4$ to uranium metal with a metal reductant such as calcium, and then contacting the uranium metal with nitrogen at a temperature high enough to form uranium nitride. These processes have the disadvantages that they are less efficient than single-step processes and their product contains a high concentration of contaminants such as oxygen. Improved methods of making these compounds are desirable.

It is accordingly one object of our invention to provide an improved method of making uranium nitride, carbide, sulfide, silicide, and phosphide from uranium hexafluoride.

It is another object to provide a one-step process for converting uranium hexafluoride to said uranium compounds.

Other objects of our invention will become apparent from the following description and claims.

In accordance with our invention we have provided a method of making a uranium compound selected from uranium nitride, carbide, sulfide, silicide, and phosphide comprising the step of contacting gaseous $UF_6$ with an alkali metal vapor and an oxygen-free gas containing a member of the group consisting of nitrogen, carbon, sulfur, silicon, and phosphorus at a temperature of 800° C. to 1300° C. and a pressure less than 25 torr (1 mm. Hg).

Our method produces uranium compounds from $UF_6$ in one step. The product has a high degree of purity; for instance, the oxygen content may be maintained below 2 p.p.m. compared to 2500–5000 p.p.m. for typical compounds prepared in a multi-stage process.

In carrying out our invention the reactants are introduced into a reaction zone maintained at a temperature of 800–1300° C. and a pressure of less than 25 torr (1 mm. Hg), and the volatile reaction products and excess reactants are continuously swept out of the reaction zone.

Any alkali metal vapor or mixture of alkali metals in vapor form may be used as the reducing agent. The amount used must be in stoichiometric excess of the quantity needed to convert $UF_6$ to uranium metal, and an excess of 100 to 200 percent of this quantity is preferred.

The component furnishing the other element of the uranium compound may be a gas of that element, such as nitrogen, or any gaseous compound which forms such an element under the conditions of temperature and pressure involved. It is essential that any gaseous compound not introduce undesirable contaminants into the reaction zone. Typical of the useful gases which may be used are: for forming uranium nitrides—nitrogen and ammonia; for forming uranium carbides—organic hydrocarbons such as methane, ethane, butane, propane and acetylene; for forming uranium sulfides—hydrogen sulfide; for forming uranium silicides—the silicon halides; and for forming uranium phosphides—phosphine. These gases must be present in an amount sufficient to form the desired compound with all the uranium present, and a stoichiometric excess of 25 to 200 percent is preferred.

The reactants may be introduced into the reaction zone separately, but in order to prevent deposition of uranium metal it is essential that the $UF_6$ be mixed with the gaseous component furnishing the desired element for the uranium compound before its contact with the alkali metal vapor; consequently in the preferred method of carrying out our invention these two gases are introduced into the reaction zone together.

The temperature within the reaction zone is selected to be at a value within the range between 800° C. and 1300° C. at which the desired compound is stable.

The pressure must be below the vapor pressure of the alkali metal fluoride formed in the reaction zone.

Having thus described our invention, the following examples are offered to illustrate it in more detail.

Example I

A reaction vessel was heated to a temperature of 1050° C. and the pressure therein was maintained at 15 torr. $UF_6$ and $N_2$ in a volumetric ratio of 1:0.67, respectively, were metered into the reaction zone by concentric tubes. Lithium vapor at a temperature of 700° C. and in an amount sufficient to provide an excess of about 100 percent was introduced into the reaction zone from a separate nozzle. LiF vapor, unreacted nitrogen, and unreacted Li vapor were continuously removed from the reaction zone. The solid reaction product, adhering to a mandrel disposed in the reaction zone, was substantially pure UN.

Example II

A reaction vessel is heated to a temperature of 950° C. and the pressure therein is maintained at 5 torr. $UF_6$ and $CH_4$ in a volumetric ratio of 1:3, respectively, are metered into the reaction zone. Lithium vapor at a temperature of 700° C. and in an excess of about 100 percent is introduced into the reaction vessel from a separate nozzle. UC is formed and deposited within the reaction zone.

Example III

A reaction vessel is heated to a temperature of 1100° C. and the pressure therein is maintained at 20 torr (1 mm. Hg). $UF_6$ and $H_2S$ in a volumetric ratio of 1:2, respectively, are metered into the reaction zine. Lithium vapor at a temperature of 700° C. and in an excess of about 100 percent is introduced into the reaction vessel from a separate nozzle. Uranium sulfide (US) is formed and deposited in the reaction zone.

Example IV

A reaction vessel is heated to a temperature of 1000° C. and the pressure therein is maintained at 3 torr (1 mm. Hg). $UF_6$ and $SiH_4$ in equal volumes are introduced into the reaction zone. Lithium vapor at 700° C. and in an excess of about 100 percent is introduced into the reaction vessel from a separate nozzle. A uranium silicide is formed and deposited in the reaction vessel.

Example V

A reaction vessel is heated to 900° C. and is maintained at a pressure of 10 torr (1 mm. Hg). $UF_6$ and $PH_3$ in a volumetric ratio of 1:1.5, respectively, are introduced into the reaction zone. Lithium at about 700° C. and in an excess of about 100% is introduced into the reaction zone through a separate nozzle. A uranium phosphide is formed and deposited within the reaction zone.

The above examples are intended to illustrate, not to limit our invention.

We claim:

1. A method of making a uranium compound selected from the group consisting of uranium nitrides, carbides, sulfides, silicides, and phosphides comprising contacting gaseous $UF_6$ with an alkali metal vapor in stoichiometric excess of the quantity needed to convert $UF_6$ to uranium metal and a non-oxygen containing gas containing at least one member selected from the group consisting of nitrogen, carbon, sulfur, silicon, and phosphorus at a temperature of 800° C. to 1300° C. and a pressure less than 25 torr (1 mm. Hg).

2. The method of claim 1 wherein UN is formed.

3. The method of claim 1 wherein UN is formed by contacting $UF_6$ with an alkali metal vapor and nitrogen gas.

4. The method of claim 1 wherein UC is formed.

5. The method of claim 1 wherein UC is formed by contacting $UF_6$ with an alkali metal vapor and an organic hydrocarbon.

6. The method of claim 1 wherein uranium sulfide is formed.

7. The method of claim 1 wherein uranium sulfide is formed by contacting $UF_6$ with an alkali metal vapor and a sulfide.

8. The method of claim 1 wherein uranium silicide is formed.

9. The method of claim 1 wherein uranium silicide is formed by contacting $UF_6$ with an alkali metal vapor and a silicon halide.

10. The method of claim 1 wherein uranium phosphide is formed.

References Cited

UNITED STATES PATENTS 3,288,572　11/1966　Fontana _____ 23—349

CARL D. QUARFORTH, *Primary Examiner.*

S. TRAUB, *Assistant Examiner.*